United States Patent [19]

Otaka et al.

[11] Patent Number: 5,298,990
[45] Date of Patent: Mar. 29, 1994

[54] VIDEO SIGNAL BLOCK FORMING METHOD

[75] Inventors: Hideki Otaka, Neyagawa; Tatsuro Juri, Osaka, both of Japan

[73] Assignee: Matsushita Electric Industrial Co., Ltd., Osaka, Japan

[21] Appl. No.: 733,210

[22] Filed: Jul. 19, 1991

[30] Foreign Application Priority Data

Jul. 20, 1990 [JP] Japan .................. 2-193625

[51] Int. Cl.$^5$ ............................ H04N 7/12
[52] U.S. Cl. ................... 348/420; 358/433; 348/571
[58] Field of Search ............ 358/133, 136, 138, 141, 358/433; H04N 7/12

[56] References Cited

U.S. PATENT DOCUMENTS

| | | | |
|---|---|---|---|
| 4,797,740 | 1/1989 | Harasaki et al. | 358/136 |
| 4,914,515 | 4/1990 | Van Luyt | 358/136 |
| 5,099,325 | 3/1992 | Artieri et al. | 358/125 X |

FOREIGN PATENT DOCUMENTS 0046884 2/1988 Japan .

*Primary Examiner*—Victor R. Kostak
*Attorney, Agent, or Firm*—Wenderoth, Lind & Ponack

[57] ABSTRACT

When dividing a video signal composed of horizontal H pixels and vertical V pixels into blocks of (m × n) pixels composed of horizontal m pixels and vertical n pixels, when the number of horizontal pixels or the number of vertical pixels is not equal to an integer multiple of m or n, respectively, the video signal is first divided into blocks of (m × n) pixels and sub-blocks of a smaller size. Then, a plurality of sub-blocks are put together to make up a block of (m × n) pixels.

8 Claims, 7 Drawing Sheets

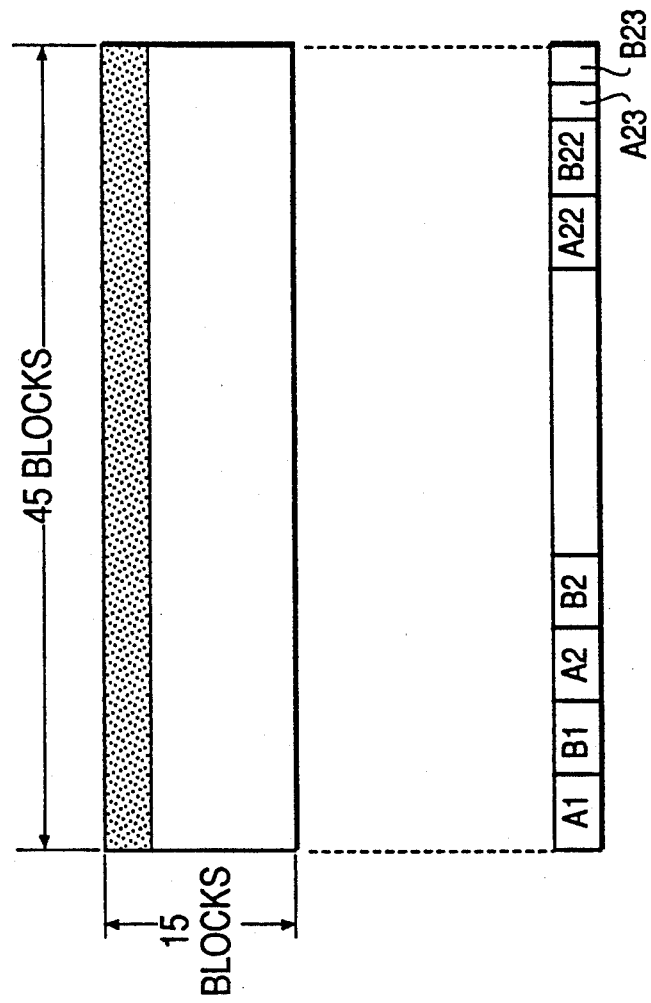
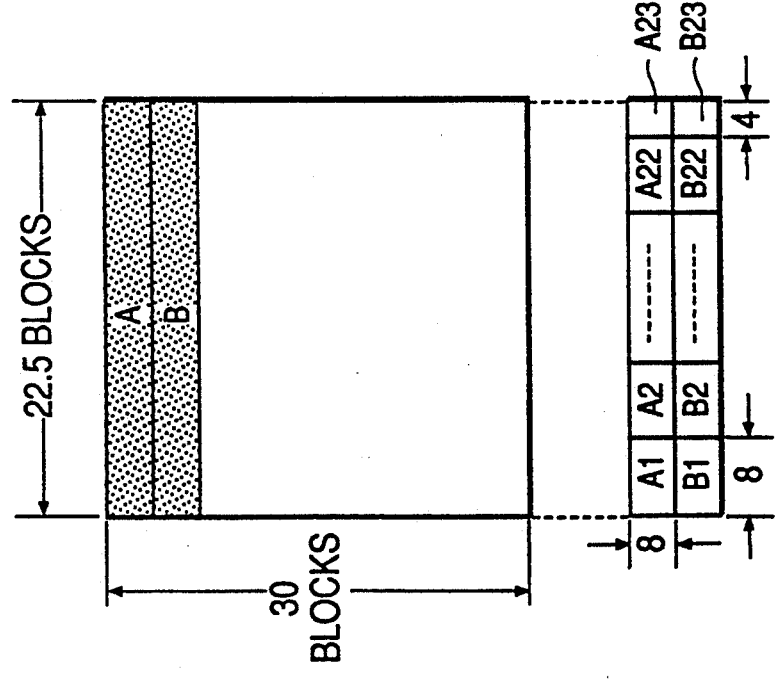

(WRITING METHOD)

(READING METHOD)

(WRITING METHOD)

(READING METHOD)

VIDEO SIGNAL BLOCK FORMING METHOD

BACKGROUND OF THE INVENTION

1. Field of the Invention

The present invention relates to a video signal block forming method for forming a video signal in blocks and for processing signals in block units.

2. Description of the Prior Art

Generally a video signal has an extremely large quantity of information, and a method of curtailing the quantity of information by high efficiency coding is employed as an effective means when recording or transmitting. One of such means is a method of dividing the image into blocks, and performing high efficiency coding in block units, and a representative coding method is an orthogonal transformation coding. Explained below is a method of dividing the video signal into blocks by referring to an example of applying the orthogonal transformation coding to components signals of the existing method.

As the sampling frequency for handling the conventional component signals,

Y :fs = 13.5 MHz
R−Y:fs/2 = 6.75 MHz
B−Y:fs/2 = 6.75 MHz are standardized. If a signal is composed of 525 vertical lines, then the number of active pixels and the number of active lines in one field are as shown in Table 1.

TABLE 1

|  | Number of active pixels | Number of active lines |
| --- | --- | --- |
| Y | 720 | 240 |
| R − Y | 360 | 240 |
| B − Y | 360 | 240 |

The signal sampled as shown in Table 1 is an integer multiple of 8 in both number of active pixels and number of active lines, and can be divided into blocks of 8 pixels ×8 lines, and in this case the number of blocks is as shown in Table 2.

TABLE 2

|  | Number of horizontal blocks | Number of vertical blocks |
| --- | --- | --- |
| Y | 90 | 30 |
| R − Y | 45 | 30 |
| B − Y | 45 | 30 |

In such block forming method, however, the following problems are present.

The signal sampled at the above sampling frequency is an integer multiple of 8 in the number of horizontal pixels, in both luminance signal (Y) and color difference signals (R−Y, B−Y), and it was easily possible to divide into blocks composed of 8 horizontal pixels and 8 vertical pixels. However, if the number of pixels is different, for example, when the color difference signal sampled at 6.75 MHz is decimated to reduce the number of pixels in the horizontal direction in half, the number of horizontal pixels is 180, which does not agree with a multiple of 8. Therefore, when the number of active pixels in the horizontal direction is not an integer multiple of the number of horizontal pixels composing one block, conventionally, the number of active pixels in the horizontal direction was enlarged or reduced before dividing then into blocks. In other words, it was necessary to code the portion that was actually not necessary to transmit, or to code by cutting off the active pixels that should be transmitted. Besides, if the number of pixels in the vertical direction was not an integer multiple of the number of vertical pixels composing one block, a similar processing was required.

SUMMARY OF THE INVENTION

It is hence a primary object of the invention to realize a block forming method of video signal when the number of pixels in the horizontal direction or vertical direction of video signal is not equal to an integer multiple of the number of pixels in each direction for composing one block.

To achieve the above object, the invention presents a block forming method of video signal for dividing a video signal composed of horizontal H pixels and vertical V pixels into blocks of (m×n) pixels composed of horizontal m pixels and vertical n pixels, in which when the number of horizontal pixels H is expressed as $$H = k \times m + r,$$

the video signal is divided into blocks of (m×n) pixels composed of horizontal m pixels and vertical n pixels, and sub-blocks of (r×n) pixels composed of horizontal r pixels and vertical n pixels, and m/r pieces of sub-blocks of (r×n) pixels are gathered together to form a block of (m×n) pixels.

Besides, when the number of vertical pixels V is expressed as $$V = 1 \times n + s,$$

the video signal is divided into blocks of (m×n) pixels composed of horizontal m pixels and vertical n pixels, and sub-blocks of (m×s) pixels composed of horizontal m pixels and vertical s pixels, and n/s pieces of sub-blocks of (m×s) pixels are gathered together to form a block of (m×n) pixels.

According to the above method, when the video signal of which number of horizontal pixels is not equal to an integer multiple of the number of horizontal pixels m for composing one block is divided into blocks of (m×n) pixels, sub-blocks of (r pixels×n lines) are produced aside from the above blocks, but by composing a block of (m×n) pixels by gathering together m/r pieces of such sub-blocks, the entire picture may be divided into blocks of (m×n) pixels.

Or when the video signal of which number of vertical pixels is not equal to an integer multiple of the number of vertical pixels n for composing one block is divided into blocks of (m pixels×n pixels), sub-blocks of (m pixels×s lines) are produced aside from the above blocks, but by composing a block of (m pixels×n pixels) by gathering together n/r pieces of such sub-blocks, the entire picture may be divided into blocks of (m pixels×n lines).

BRIEF DESCRIPTION OF THE DRAWINGS

FIGS. 1(a)-1(b) are explanatory diagrams of a block forming method in accordance with a first embodiment of the present invention;

DESCRIPTION OF THE PREFERRED EMBODIMENT

Figure 2:
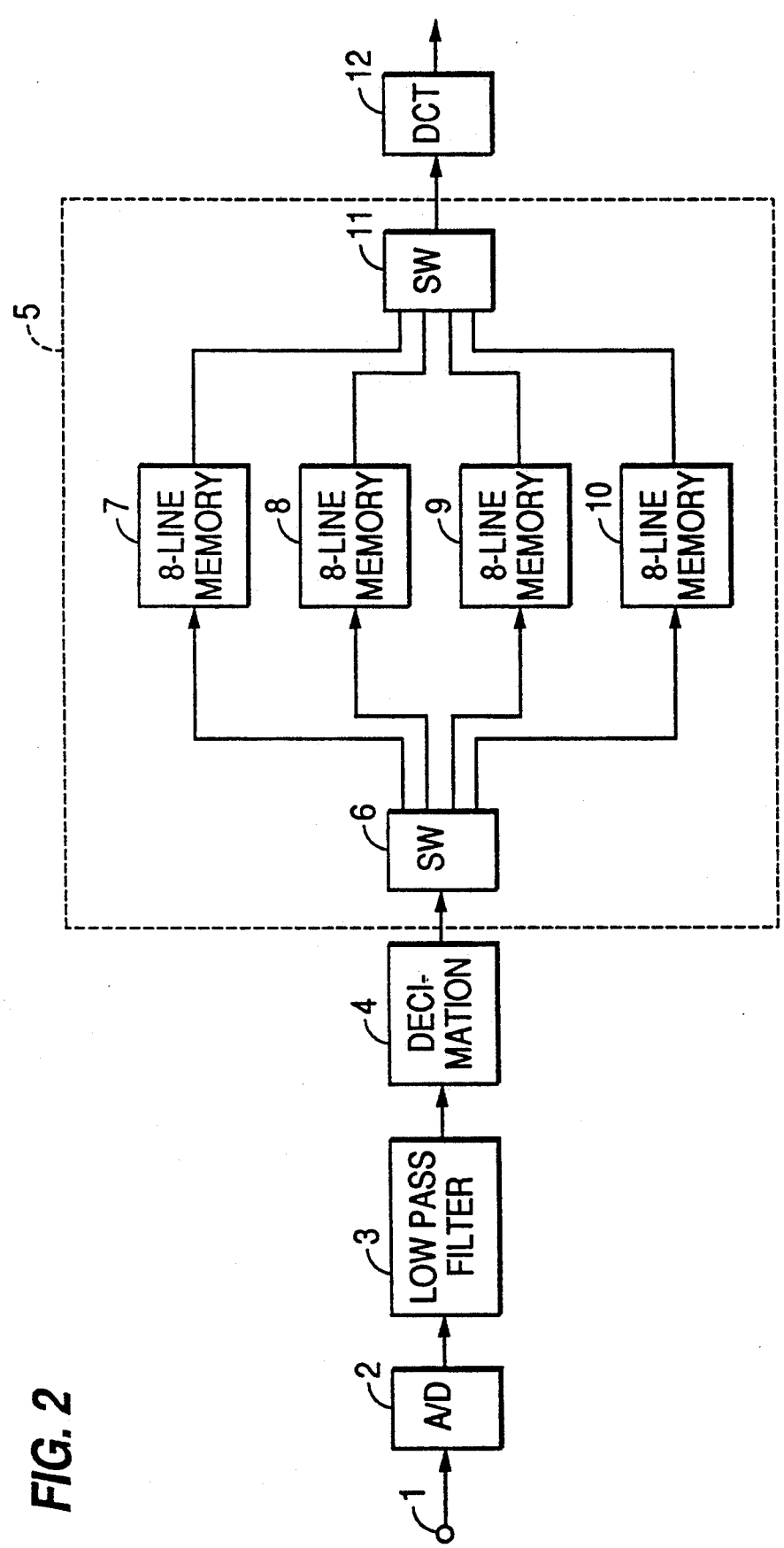
FIG. 2 is a block diagram showing a composition of the block forming method of the first embodiment of the invention.

Referring now to the drawings, some of the preferred embodiments of the present invention are described in detail below.

FIGS. 1(a)-1(b) relating to a first embodiment of the present invention, are diagrams for showing a block forming method by sampling the color difference signal of a conventional component signal at 6.75 MHz, and decimating in the horizontal direction. In this case, after decimation, the number of pixels per field is number of horizontal pixels = 180
number of vertical pixels = 240 and it is supposed to divide into blocks of (8×8) pixels composed of horizontal 8 pixels and vertical 8 pixels. In this case, the number of active pixels in the horizontal direction H (=180) may be expressed, by using the number of horizontal pixels per block m (=8), as follows:

$$H = 22 \times m + 4.$$

Therefore, in FIG. 1 (a), while A1, B1, ..., A22, and B22 are divided into blocks of (8×8) pixels, A23 and B23 are divided into sub-blocks of (4×8) pixels. By collecting two sub-blocks of (4×8) pixels, one block of (8×8) pixels is composed, and therefore, as shown in FIG. 1 (b), the vertically adjacent sub-blocks A23 and B23 are put together to compose one block. By employing this method sequentially in the vertical direction, one field may be divided into blocks of (8×8) pixels.

FIG. 2 is a structural example for realizing the first embodiment, in which element 1 is an input terminal for receiving a color difference signal; element 2 is an A/D converter for converting the input signal into a digital signal; element 3 is a low pass filter for limiting the band for decimation, 4 is a decimation circuit for decimating every other pixel; element 5 is a block forming device; element 6 and 11 are switches, and elements 7, 8, 9 and 10 are memories having a capacity of 8 lines each. Besides, element 12 is a discrete cosine transformation (DCT) calculation unit. The operation of this embodiment is described below.

The color difference signal input to the terminal 1 is converted into a digital signal by the A/D converter 2 at a sampling frequency of 6.75 MHz. To prevent folding distortion by decimation, the frequency components of (3.375/2) MHz or more are attenuated by the low pass filter 3, and by decimation by the decimation circuit 4, the number of pixels in the horizontal direction becomes half of the original number of pixels. Next, the signal is divided into blocks of (8 pixels × 8 lines) by the block forming device 5, and in this case since the number of horizontal pixels after decimation is 180, being an integer multiple of 8, the adjacent A23 and B23 are put together to form one block of (8 pixels × 8 lines) as shown in FIG. 2. Here, since the number of blocks in the vertical direction is a multiple of 2, the signal is divided into blocks in a total of (45 × 15).

Figure 3A:
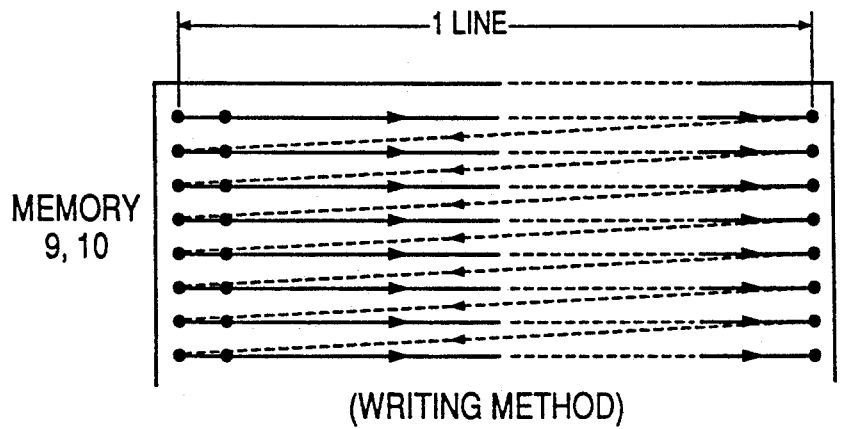
FIGS. 3(a)-3(b) are explanatory diagrams showing the memory writing and reading method in accordance with the first embodiment of the present invention.
Figure 3B:
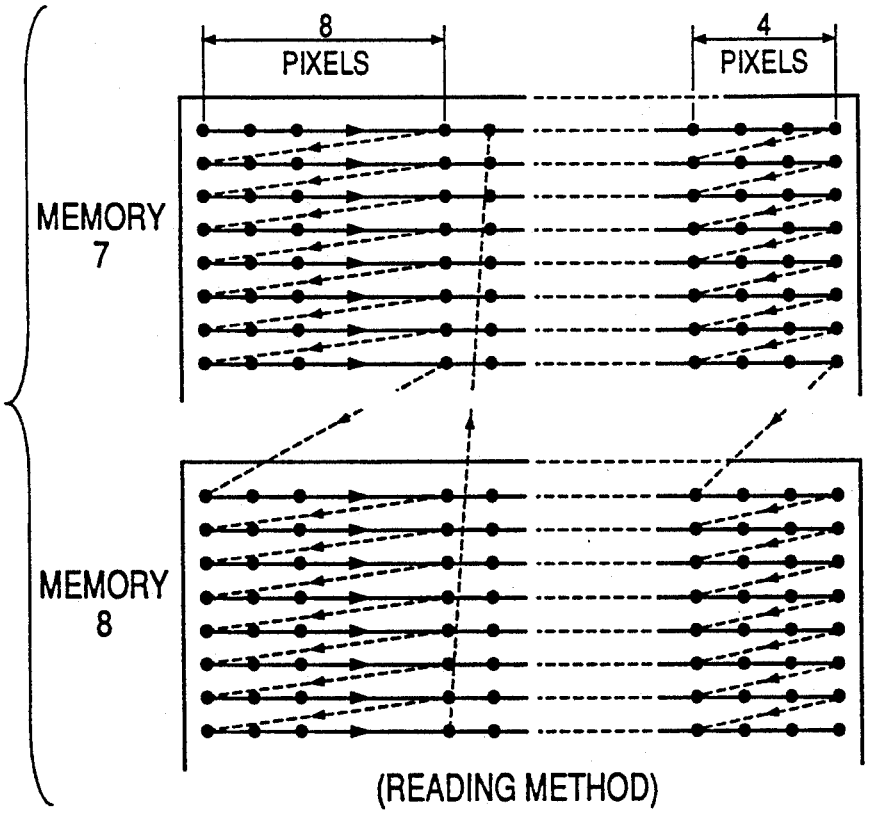

It is the block forming device 5 that is responsible for dividing into blocks as explained herein, and this block forming is realized by possessing four memories for the portion of 8 lines, using two of the four memories for writing and the other two for reading, and by changing over writing and reading in the unit of 8 lines. In other words, when using the memories 7 and 8 for reading and the memories 9 and 10 for writing, as shown in FIG. 3 (a), the data for 8 lines are sequentially written in the memories 9 and 10, while simultaneously the data is alternately read out from the memories 7 and 8 in the block units as shown in FIG. 3 (b). In this case, the switch 6 is used for writing by selecting the memories 7 and 8, and the switch 11 is used for reading by selecting the memories 7 and 8 alternately in the block units.

Figure 4:
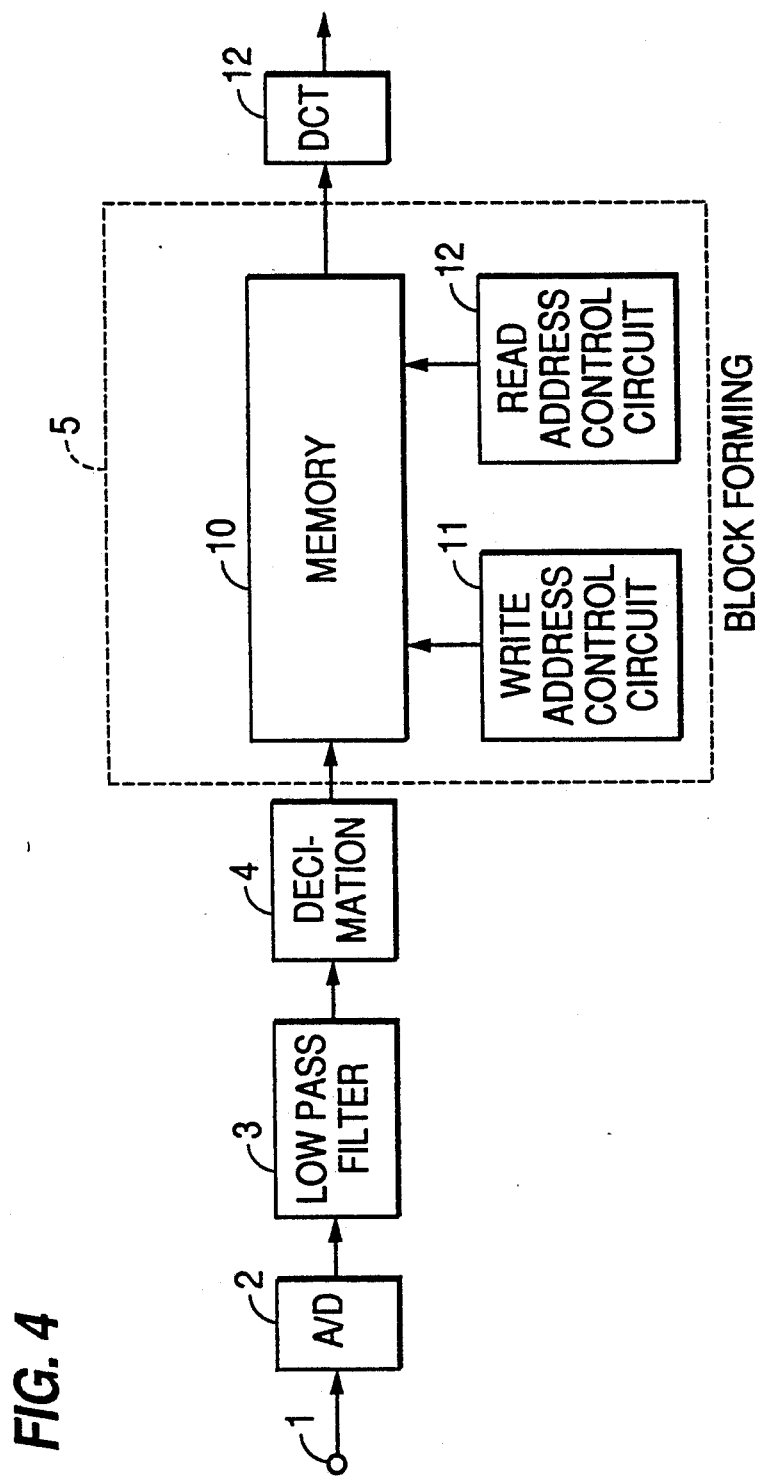
FIG. 4 is a block diagram showing another composition of the block forming method in accordance with the first embodiment of the present invention.

FIG. 4 is a diagram showing another structural example of the block forming device 5 which is one of the constituent elements in FIG. 2. In FIG. 2, the data is divided into blocks within the field, but in order to improve the picture quality by high efficiency coding, two fields are put together to be formed into a frame, and coding may be done in the frame unit. FIG. 4 corresponds to a block forming method of this case. In FIG. 4, numeral 10 is a memory having a capacity of one frame or more; element 11 is a write address control circuit; element 12 is a read address control circuit, and the other constituent elements are the same as those shown in FIG. 1.

In the memory 10, one frame is composed of two fields, and block forming is processed at the same time. First, when writing, the writing is effected in the sequence of input of video signals by the control the write address control circuit 11, and when reading, one frame is composed of two fields by the control of the reading address control circuit 12, thereby forming blocks as shown in FIGS. 1(a)-1(b) at the same time.

Thus, according to the embodiment, by forming into a block of (8×8) pixels by putting together vertically adjacent sub-blocks of (4×8) pixels, the entire picture can be divided into blocks of (8×8) pixels.

Figure 5:
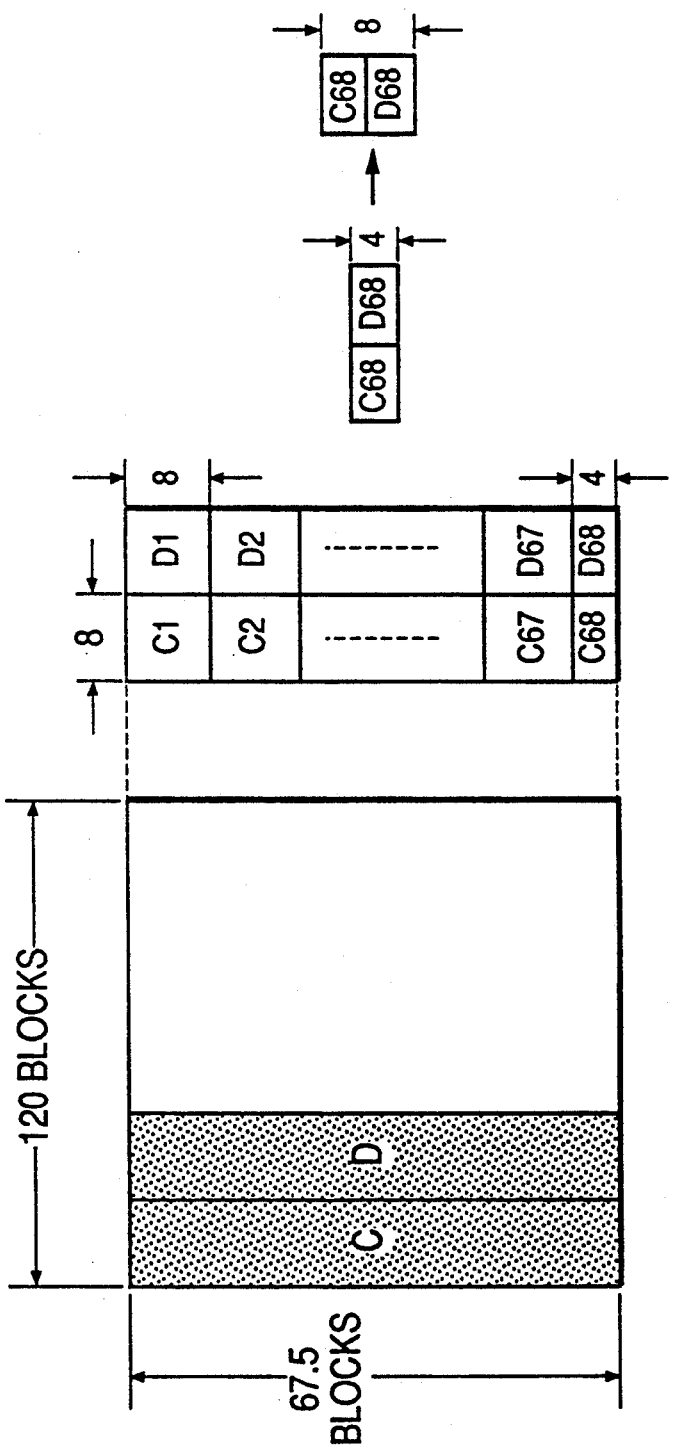
FIG. 5 is an explanatory diagram of a block forming method in accordance with a second embodiment of the present invention.

FIG. 5 is a diagram showing a block forming method of color difference signal of HDTV signal in accordance with a second embodiment of the present invention. The number of pixels of color difference per field is respectively.

number of horizontal pixels × 960
number of vertical pixels × 540 and the signal is divided into blocks of (8×8) pixels consisting of horizontal 8 pixels and vertical 8 pixels. Here, the number of effective pixels in the vertical direction V (=540) may be expressed, by using the number of vertical pixels per block n (=8), as follows:

$$V = 67 \times n + 4.$$

Therefore, in FIG. 5, C1, D1, ..., C67, and D67 are divided into blocks of (8×8) pixels, while C68 and D68 are divided into sub-blocks of (8×4) pixels. By putting together two sub-blocks of (8×4) pixels, one block of (8×8) pixels is formed, and therefore, as shown in FIG.

5, the horizontally adjacent sub-blocks C68 and D68 are combined to make up one block. By employing this method sequentially in the horizontal direction, one field may be divided into blocks of (8×8) pixels.

Figure 6:
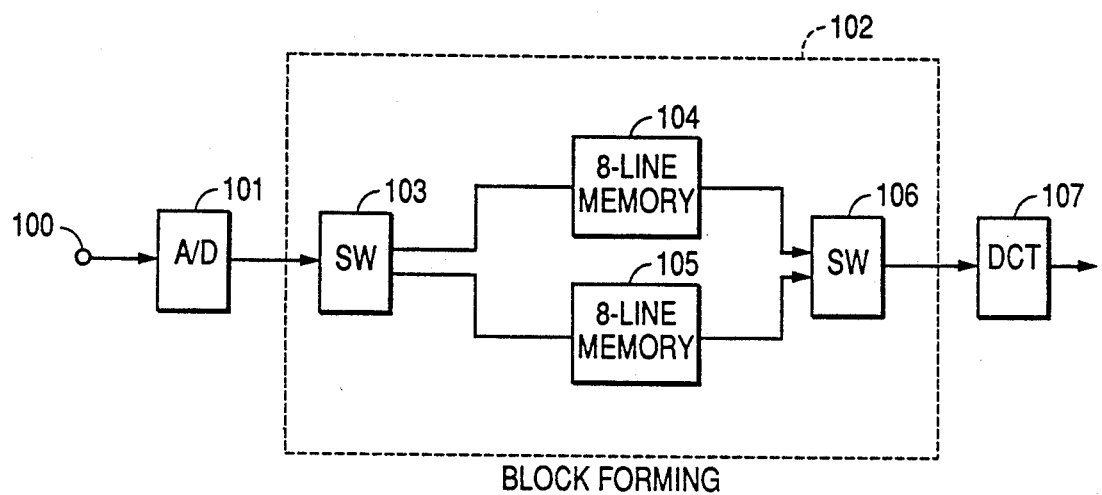
FIG. 6 is a block diagram showing a composition of the block forming method in accordance with the second embodiment of the present invention.

FIG. 6 is a structural example for realizing the second embodiment, in which element 100 is an input terminal for receiving a color difference signal; element 101 is an A/D converter for converting the input signal into a digital signal; element 102 is a block forming device; element 103 and 106 are switches, and elements 105 and 105 are memories having a capacity of 8 lines each. Meanwhile, element 107 is a DCT calculation unit. The operation of this embodiment is explained below.

A color difference signal input to the terminal 100 is converted into a digital signal by the A/D converter 101 at a sampling frequency of 37.125 MHz. It is then divided into blocks of (8×8) pixels by the flock forming device 102, and since the number of vertical pixels is 180, being an integer multiple of 8, as mentioned above, the adjacent C68 and D68 are combined together to make up one block of (8×8) pixels as shown in FIG. 5.

Figure 7A:
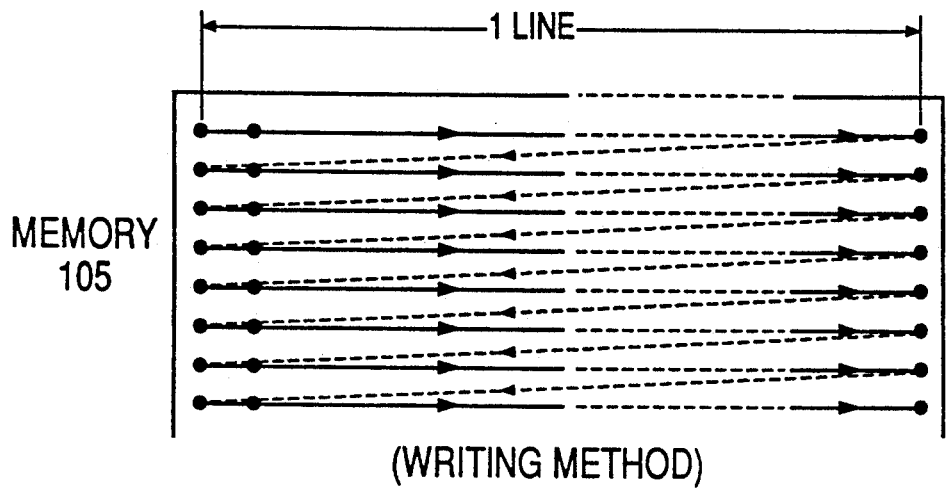
FIGS. 7(a)-7(b) are explanatory diagrams showing the memory writing and reading method in accordance with the second embodiment of the present invention.
Figure 7B:
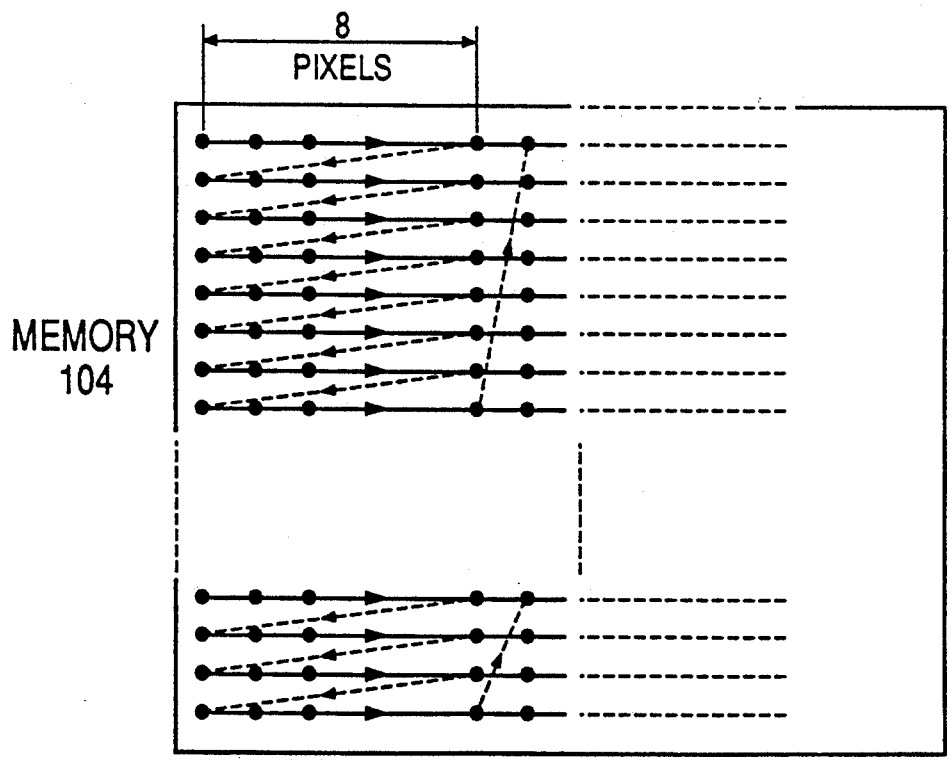

It is the block forming device 102 that is responsible for dividing into blocks as described herein, which is realized by possessing two memories with a capacity of 8 lines each, using one of the two memories for writing and the other for reading, and by changing over writing and reading in the 8-line unit. That is, when using the memory 104 for reading and the memory 105 for writing, for example, as shown in FIG. 7 (a), the data for 8 lines is written sequentially into the memory 105, while it is read out from the memory 104 simultaneously in the block unit as shown in FIG. 7 (b). In this case, the switch 103 selects the memory 105 for writing, and the switch 106 selects the memory 105 and memory 105 for reading.

Figure 8:
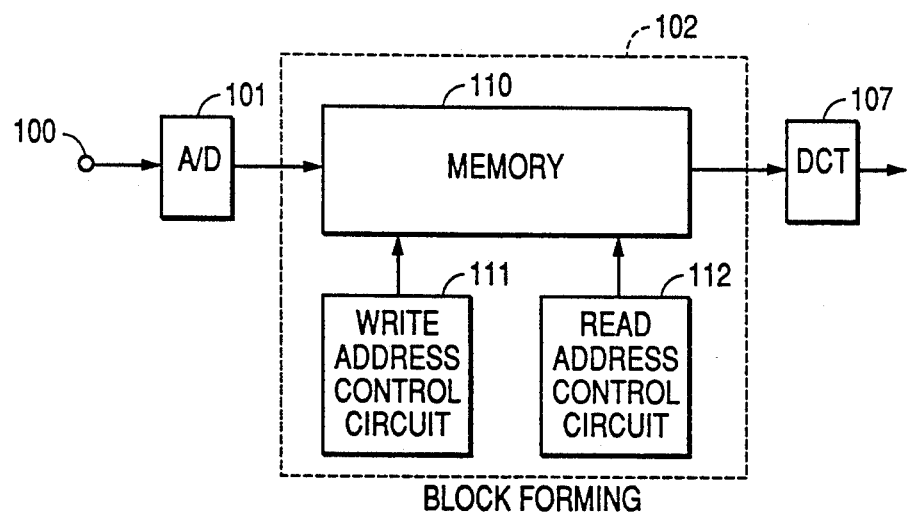
FIG. 8 is a block diagram showing another composition of the block forming method of in accordance with the second embodiment of the present invention.

FIG. 8 is another structural example of the block forming device 102 which is one of the constituent elements of FIG. 6. In FIG. 6, the signal is divided into blocks within a field, but in order to enhance the picture quality by high efficiency coding, two fields are sometimes combined to make up a frame, and coding is effected in the frame unit. FIG. 8 corresponds to a method of forming blocks in this case. In FIG. 8, element 110 is a memory with a capacity of one frame or more; element 111 is a write address control circuit; element 112 is a read address control circuit, and the other constituent elements are same as those shown in FIG. 6.

In the memory 110, one frame is composed of two fields, and block forming is processed at the same time. First, when writing, the video signals are written in the sequence of input by the control of the address control circuit 111, and when reading, one frame is composed of two fields by the control of the read address control circuit 112, while block forming is processed at the same time as shown in FIG. 5.

Thus, according to this embodiment, by combining two horizontally adjacent sub-blocks of (8×4) pixels together to make up one block of (8×8) pixels, the entire picture can be divided into blocks of (8×8) pixels.

What is claimed is:

1. A block forming method for dividing a video signal of (H×V) pixels composed of H horizontal pixels and V vertical pixels into blocks of (m×n) pixels each composed of m horizontal pixels and n vertical pixels, where the number H of horizontal pixels satisfies a condition expressed as $H=k\times m+r$, where k is an integer and where $r<m$, said method comprising the steps of:
   dividing said video signal into blocks of (m×n) pixels each composed of m horizontal pixels and n vertical pixels and sub-blocks or (r×n) pixels each composed of r horizontal pixels and n vertical pixels; and
   gathering m/r pieces of sub-blocks of (r×n) pixels to form a block of (m×n) pixels.

2. A method according to claim 1, wherein the m/r pieces of sub-blocks of (r×n) pixels gathered in said gathering step are disposed vertically adjacent to each other.

3. A block forming method for dividing a video signal of (H×V) pixels composed of H horizontal pixels and V vertical pixels into blocks of (m×n) pixels each composed of m horizontal pixels and n vertical pixels, where the number of vertical pixels V satisfies a condition expressed as $V=l\times n+s$, where l is an integer and where $s<n$, said method comprising the steps of:
   dividing said video signal into blocks of (m×n) pixels each composed of m horizontal pixels and n vertical pixels and sub-blocks of (m×s) pixels each composed of m horizontal pixels and s vertical pixels; and
   gathering n/s pieces of sub-blocks of (m×s) pixels to form a block of (m×n) pixels.

4. A method according to claim 3, wherein the n/s pieces of sub-blocks of (m×s) pixels gathering in said gathering step are disposed horizontally adjacent to each other.

5. A block forming method for converting a first video signal representing (H×V) pixels composed of H horizontal pixels and V vertical pixels into a second video signal representing blocks of (m×n) pixels each composed of m horizontal pixels and n vertical pixels, where the number H of horizontal pixels satisfies a condition expressed as $H=k\times m+r$, where k is an integer and where $r<m$, said method comprising the steps of:
   dividing said video signal into blocks of (m×n) pixels each composed of m horizontal pixels and n vertical pixels and sub-blocks of (r×n) pixels each composed of r horizontal pixels and n vertical pixels;
   gathering m/r pieces of sub-blocks of (r×n) pixels to form a block of (m×n) pixels; and,
   assembling the blocks of (m×n) pixels of said dividing step and the block of (m×n) pixels of said gathering step to form the second video signal.

6. A method according to claim 5, wherein the m/r pieces of sub-blocks of (r×n) pixels gathered in said gathering step are disposed vertically adjacent to each other.

7. A block forming method for converting a first video signal representing (H×V) pixels composed of H horizontal pixels and V vertical pixels into a second video signal representing blocks of (m×n) pixels each composed of m horizontal pixels and n vertical pixels, where the number V of vertical pixels satisfies a condition expressed as $V=l\times n+s$, where l is an integer and where $s<n$, said method comprising the steps of:
   dividing said video signal into blocks of (m×n) pixels each composed of m horizontal pixels and n vertical pixels and sub-blocks of (m×s) pixels each composed of m horizontal pixels and s vertical pixels;
   gathering n/s pieces of sub-blocks of (m×s) pixels to form a block of (m×n) pixels; and,
   assembling the blocks of (m×n) pixels of said dividing step and the block of (m×n) pixels of said gathering step to form the second video signal.

8. A method according to claim 7, wherein the n/s pieces of sub-blocks of (m×s) pixels gathered in said gathering step are disposed horizontally adjacent to each other.

* * * * *